United States Patent
Kacavenda

(10) Patent No.: US 7,232,216 B2
(45) Date of Patent: Jun. 19, 2007

(54) RECESSED HINGE TO MAKE THE TEMPLES OF SPECTACLES ELASTIC

(75) Inventor: Milan Kacavenda, Pieve di Cadore (IT)

(73) Assignee: Skeyottica di Kacavenda Milenko, Pieve Di Cadore (IT)

( * ) Notice: Subject to any disclaimer, the term of this patent is extended or adjusted under 35 U.S.C. 154(b) by 0 days.

(21) Appl. No.: 10/565,159

(22) PCT Filed: Jul. 21, 2004

(86) PCT No.: PCT/IB2004/002336

§ 371 (c)(1),
(2), (4) Date: Jan. 19, 2006

(87) PCT Pub. No.: WO2005/008317

PCT Pub. Date: Jan. 27, 2005

(65) Prior Publication Data

US 2006/0209251 A1    Sep. 21, 2006

(30) Foreign Application Priority Data

Jul. 22, 2003    (IT)    .................... BL2003A0011

(51) Int. Cl.
    *G02C 5/22*    (2006.01)
(52) U.S. Cl. .................... 351/153; 351/113; 16/228
(58) Field of Classification Search ................ 351/153, 351/140, 113, 111, 41; 16/228
    See application file for complete search history.

(56) References Cited

U.S. PATENT DOCUMENTS

| | | |
|---|---|---|
| 1,504,212 A | 8/1924 | Carlson |
| 1,589,051 A | 6/1926 | Clulee |
| 1,729,901 A | 1/1929 | Simonds et al. |
| 3,633,243 A | 1/1972 | Dietrich et al. |
| 3,944,344 A | 3/1976 | Wichers |
| 4,534,628 A | 8/1985 | Morel |
| 4,747,183 A | 5/1988 | Drlik |
| 5,400,090 A | 3/1995 | Chen |
| 5,517,258 A | 5/1996 | Naito |
| 6,353,965 B1 * | 3/2002 | Lo ........................ 16/228 |
| 6,910,247 B1 * | 6/2005 | Tabacchi .................. 16/228 |

FOREIGN PATENT DOCUMENTS

DE    2948113    4/1981

(Continued)

*Primary Examiner*—Hung Xuan Dang
(74) *Attorney, Agent, or Firm*—Stevens, Davis, Miller & Mosher, LLP

(57) ABSTRACT

Disclosed is a recessed hinge to make a temple elastic with respect to a respective end piece of a frame of a pair of spectacles. The hinge includes at least a male hinging element pivoted to at least a corresponding female element. The male hinging element includes at least a tie-rod able to slide with respect to the temple, a bushing arranged inside the temple and axially associated with the tie-rod, and an elastic means loaded between the bushing and an abutment element attached to the tie-rod. The female element includes a seating made in the end piece by removing material. The male hinging element also includes a hook element, solid with the tie-rod, housed in the seating, which articulates on a pin arranged inside the seating.

19 Claims, 5 Drawing Sheets

FOREIGN PATENT DOCUMENTS

| | | |
|---|---|---|
| EP | 0003928 | 9/1979 |
| EP | 0166822 | 1/1986 |
| EP | 0462936 | 12/1991 |
| FR | 2097211 | 3/1972 |
| FR | 2340026 | 8/1977 |
| FR | 2641382 | 6/1990 |
| IT | 1147198 | 11/1986 |
| IT | 1239847 | 11/1993 |

* cited by examiner

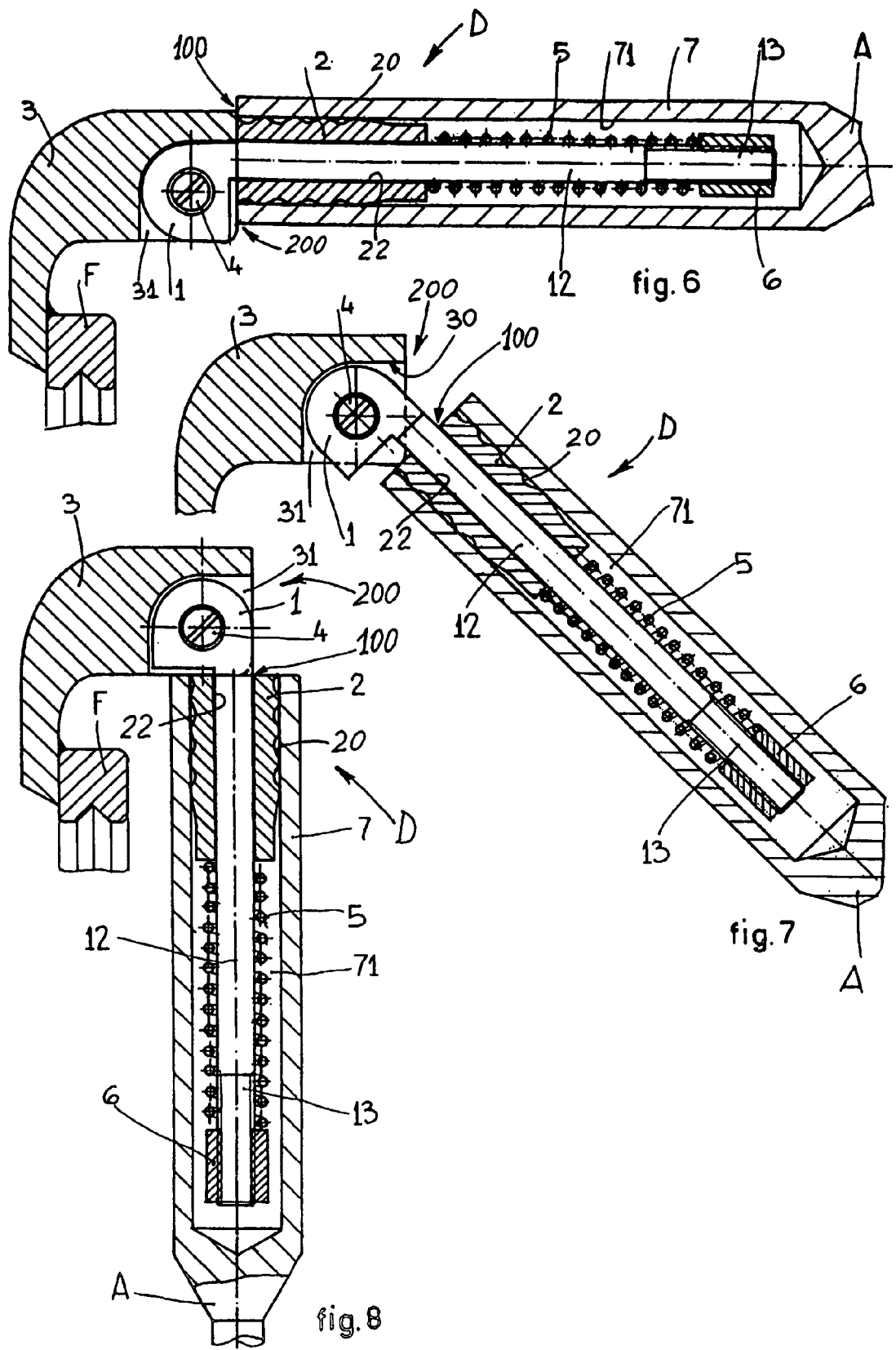

RECESSED HINGE TO MAKE THE TEMPLES OF SPECTACLES ELASTIC

This application is a §371 National Stage Application of International Application No. PCT/IB2004/002336, filed on 21 Jul. 2004, claiming the priority of Italian Patent Application No. BL2003A000011 filed on 22 Jul. 2003.

FIELD OF THE INVENTION

The present invention concerns a new conformation of the elements of a hinge in order to make adjustable, in advance, the elastic joint of two temples to two relative lateral zones, or endpieces, of a frame of a pair of spectacles, so as to ensure the best conditions for wearing the latter. The hinge according to the invention is completely integrated, substantially recessed, partly inside the frame and partly inside the relative temple. The hinge comprises at least a hinging seating made by removing material in the relative endpiece, inside which a hook element is pivoted, connected to one end of a tie-rod which in turn is mounted sliding on one end of the temple. The tie-rod cooperates axially with an elastic means, the compression of which is possibly adjustable by means of a threaded element arranged on the opposite side with respect to the hook element, in order to keep the temple normally in contact with the endpiece under every condition of use, and in order to exert the desired traction on the temple so as to condition the elastic return thereof to its open or closed positions.

The elastification of the hinges for joining the temples to the frame of spectacles is intended to facilitate, with an elastic trip movement, the opening and closing step of the temples, when the spectacles are put on or taken off, or to ensure a better adherence of the temples on the temples of the person wearing the spectacles.

BACKGROUND OF THE INVENTION

Various technical solutions are known of elasticized hinges for the articulation of the temples with respect to the frame of a pair of spectacles, attached to the temples themselves, and each comprising at least a male hinging element pivoted to at least a corresponding female element protruding from a respective lateral zone, or endpiece, of the frame and able to function as an abutment and support for the temples, both in the closed condition and in the open condition, both during opening and during closing of the temple.

The male hinging element comprises a tie-rod able to slide with respect to the temple having one end pivoted to the female element, a bushing attached inside the temple and with respect to which the tie-rod slides, and an elastic means which exerts an adjustable pressure against the bushing.

Other embodiments of elasticized hinges provide to replace the tie-rod with a box-like structure, solid with the male hinging element, which houses the elastic means, while the male hinging element is in any case hinged to the corresponding female element which protrudes from the endpiece of the frame.

In both these techniques, in order to make the device effective, it is necessary, however, that the bushing be attached to the end of the temple, so as to guarantee the compression of the elastic means, and hence the thrust that the latter makes in order to keep the temple normally against the frame. This attachment is normally made by applying screws or pins, or by making a boss or similar on the temple, in correspondence with the zone where the bushing is positioned.

Another type of known attachment provides to introduce a ball between the bushing and the temple, as described in the European Patent EP-B-0166822 in the name of OBE-Werk. This solution in any case repeats the state of the art as described above, wherein the female element protrudes from the frame of the spectacles.

Another form of attachment of the bushing to the end of the temple is described in the European Patent EP-B-0003928 in the name of LAMY & Fils, wherein the bushing is thrust by the elastic means against the bottom of a compartment in which the tie-rod slides. This solution is not only difficult to achieve and actuate during the assembly step, but also has the disadvantage that the male element must necessarily be pivoted to a female element that protrudes from the frame.

In these and in other known elasticized hinges, in order to ensure a correct pressure of each temple against the relative endpiece, apart from the normal and adjustable pre-loading, it is necessary to have a supplementary compression of the elastic means during the assembly step, as well as a centering and application of the screw, or join pin, to pivot the male element to the female element and to ensure the desired alignment of the male and female elements of the hinge.

Also because of the limited size of the parts to be hinged, these operations constitute a very difficult and demanding working and assembly step for the workers.

Moreover, the fact that the female elements or, in some cases, the male element, protrude from the ends of the frame is a problem later in the bossing step, since these parts have to be individually protected.

Not least of the disadvantages of known solutions are the high cost, the complex assembly and the difficulty of finding spare parts.

One purpose of the present invention is to achieve an elasticized hinge which allows to hinge the temples in an elasticized manner to the relative endpieces of the frame of a pair of spectacles, simply by bringing close the female elements and the male hinging elements, that is, without needing to exert supplementary compressions of the elastic means, in order to allow the alignment of the female elements and the male elements.

Another purpose of the invention is to achieve a hinge that allows to determine the correct degree of loading of the elastic means, so as to ensure over time the desired degree of elasticity of the movement of each temple, without this load being subject to variations when it is joined to its frame.

Another purpose of the invention is to ensure the bushing is stably joined to the temple without needing pins, screws, or bossing or otherwise.

Another purpose of the present invention is to make a hinge having an extremely limited cost and whose hinging elements are invisible and do not protrude from the temple and from the frame, so that no protection has to be provided during the bossing steps, and at the same time to ensure a long-lasting cleanliness and duration of the hinge itself.

Yet another purpose is to achieve a hinge which, together with the possibility of a normal elastic horizontal opening of the temples, also allows an adjustable orthogonal, and also partly rotational, opening of the temples, also in the event of knocks or irregular strains; also, to make possible a determinate pantoscopic adjustment of the frame.

Applicant has devised, tested and embodied the present invention to overcome the shortcomings of the state of the art and to obtain these and other purposes and advantages.

SUMMARY OF THE INVENTION

The present invention is set forth and characterized in the main claim, while the dependent claims describe other characteristics of the present invention or variants to the idea of the main embodiment.

In accordance with the aforesaid purposes, a recessed hinge according to the present invention is applied to elasticize a temple to a respective endpiece of a frame of a pair of spectacles.

The hinge according to the invention comprises at least a male hinging element pivoted to at least a corresponding female element.

The male hinging element comprises at least a tie-rod able to slide with respect to the temple, a bushing arranged inside the temple and axially associated with the tie-rod, and an elastic means loaded between the bushing and an abutment element attached to the tie-rod.

According to a characteristic feature of the invention, the female element comprises a seating made in the endpiece by removing material, and said male element comprises a hook element, solid with the tie-rod, housed in said seating and able to articulate on a pin arranged inside said seating.

In this way, all the components of the hinge are integrated and/or arranged inside the temple and/or the endpiece; therefore, during the finishing and bossing step, the present problems of protecting the components are avoided, and also the hinge is folded back and protected when the spectacles are being used.

According to a first form of embodiment of the invention, the male hinging element comprises two tie-rods arranged co-planar and substantially parallel with each other and able to be pivoted with the relative hook elements inside the same seating, or two relative seatings, in the endpiece.

In another embodiment, the two tie-rods are connected in a single piece with a transverse element which functions as a pin.

BRIEF DESCRIPTION OF THE DRAWINGS

These and other characteristics of the present invention will become apparent from the following description of some preferential forms of embodiment, given as a non-restrictive example with reference to the attached drawings wherein:

FIG. 6 is a longitudinal section of a first form of embodiment of the hinge according to the present invention associated with the frame and the temple of FIGS. 4 and 5, in a first operating condition;

FIG. 7 is a longitudinal section of the hinge in FIG. 6, in a second operating condition;

FIG. 8 is a longitudinal section of the hinge in FIG. 6, in a third operating condition;

DETAILED DESCRIPTION OF SOME PREFERENTIAL FORMS OF EMBODIMENT

Figure 1:
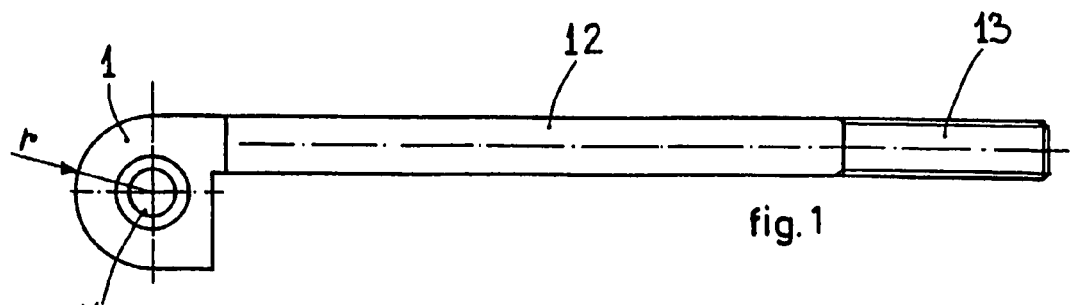
FIG. 1 is a plane view of a first form of embodiment of a detail of a male hinging element of a hinge according to the present invention.

With reference to the attached figures, the same elements are represented, or are understood as being represented, by the same reference number.

According to the constructional embodiment shown in FIGS. 1 to 8, an elasticized hinge D according to the invention substantially comprises a male hinging element 100, cooperating with a corresponding female element 200, in order to hinge a temple A to a corresponding lateral zone, or endpiece 3, of a frame F of a pair of spectacles.

The male hinging element 100 comprises (FIGS. 1, 2 and 3) a tie-rod 12 to one end of which a hook element 1 is connected, flattened and substantially semi-cylindrical in shape, a bushing 2, an elastic means 5, in this case a helical spring, and an adjustment nut 6.

The hook element 1 is equipped with a through hole 11, while the tie-rod 12, at the opposite end, has a threading 13. The tie-rod 12 is preferentially applied solid with the non-cylindrical side of the hook element 1, and in proximity with one of the two lateral straight walls.

The bushing 2 has a slightly undulating outer surface 20, with a initial lead-in 21 shaped like a truncated cone, and a through hole 22 able to house the tie-rod 12 with a slight play.

The elastic means 5 is arranged coaxially with the tie-rod 12 between the bushing 2 and the adjustment nut 6; the latter is screwed to the threading 13 of the tie-rod 12 in order to keep the elastic means 5 under pressure against the bushing 2.

Figure 2:
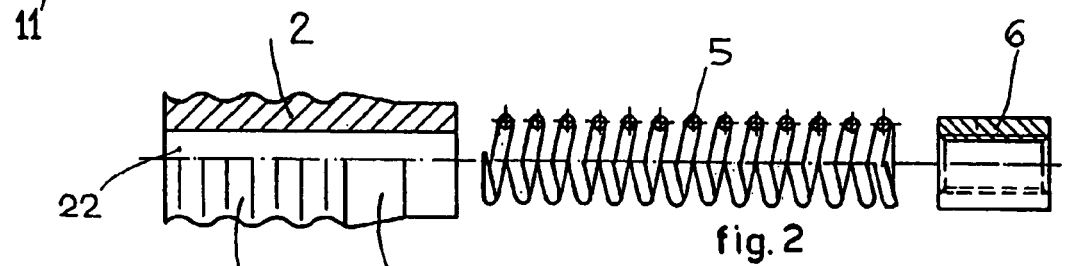
FIG. 2 is a plane view, partly in section, of a first form of embodiment of a bushing, of an elastic means and an adjustment nut, able to be axially associated with the detail shown in FIG. 1.
Figure 3:
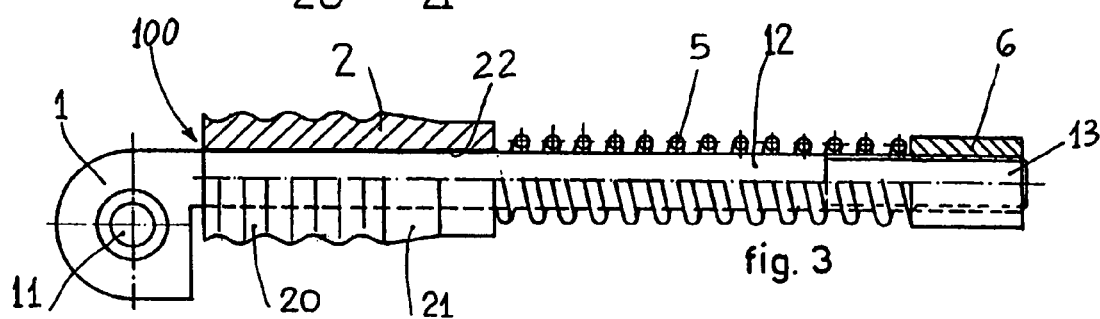
FIG. 3 is a plane view, partly in axial section, of a male hinging element of a hinge according to the present invention.
Figure 4:
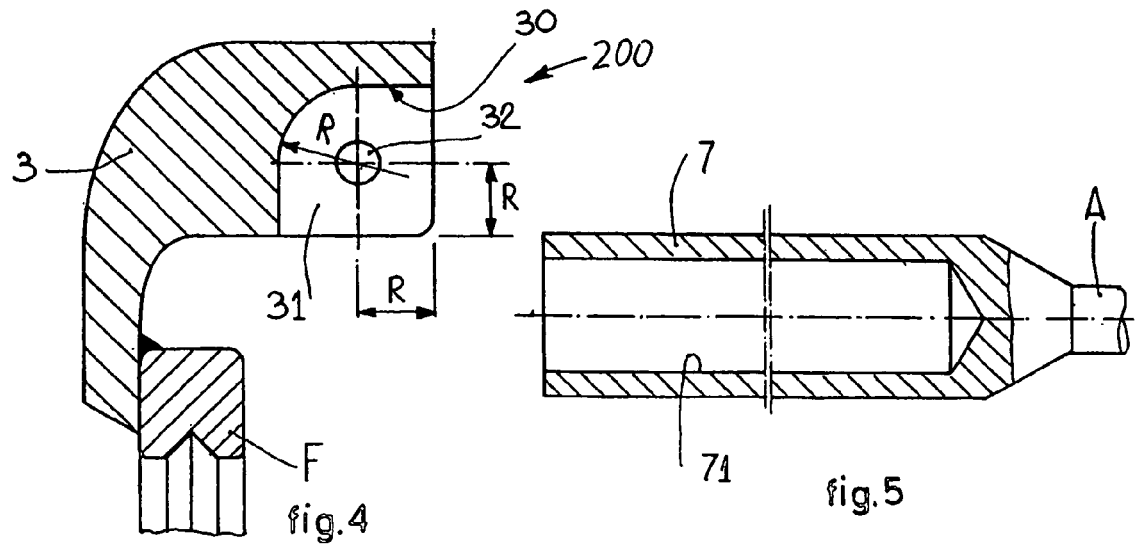
FIG. 4 is a plane view, partly in axial section, of a frame of a pair of spectacles to which the hinge according to the present invention is applied.
Figure 5:
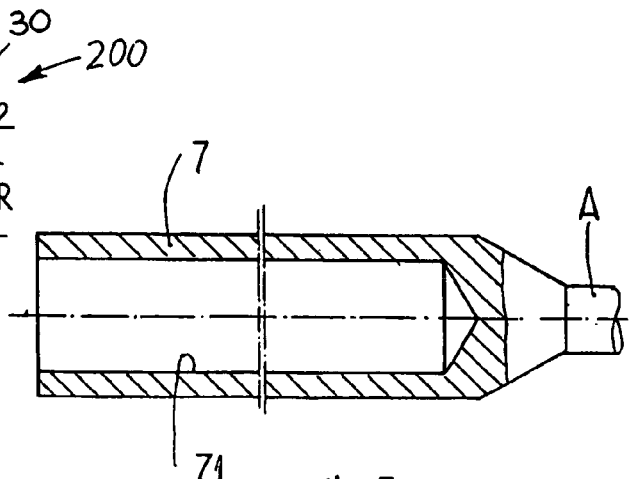
FIG. 5 is a plane view, partly in axial section, of a temple of a pair of spectacles to which the hinge according to the present invention is applied.

With particular reference to FIGS. 1, 2 and 3, it is clear that the elastification of the hinge D in question is made possible by the presence of the elastic means 5, which is inserted coaxially on the tie-rod 12 of the male hinging element 100, immediately after the bushing 2 has been inserted, until the latter abuts against the bottom of the hook element 1. Moreover, the presence of one or more adjustment nuts 6 screwed to the threading 13 allows to compress the elastic means 5 and ensures the desired elastic load of the hinge D.

The female element 200 is made directly in the endpiece 3 of the frame F (FIG. 4) and, to be more exact, comprises at least a seating 30, made by milling and defined laterally by two opposite fins 31, of which only one is visible in the figures, having the same thickness, so as to be able to house inside them the hook element 1 of the male hinging element 100.

The seating 30 has a milling radius R which corresponds to, or is slightly more than, the radius r of the curved part of the hook element 1, and has a milling center distant from the leading edge and the lower edge of the endpiece 3 of a distance equal to the radius R.

Each of the two fins 31 is also equipped with a smooth through hole 32, while the other, adjacent fin 31 is equipped with a coaxial through hole with threading, in order to screw in a pin 4 (FIGS. 6, 7 and 8) which, passing through the smooth hole 32 and through the aligned free hole 11 of the hook element 1, allows to hinge and constrain the male hinging element 100 inside the female element 200.

Each temple A (FIG. 5) has one end 7 to be hinged to the endpiece 3 of the frame F, which is equipped with an axial blind hole 71 having a depth slightly greater than the length of the male hinging element 100 of the hinge D, and with a diameter that has a slight interference with respect to the average diameter of the undulating surface 20 of the bushing 2 to be housed.

Having thus described the few parts that make up the hinge D in question, we shall now describe their evident functions, also with regard to obtaining the purposes specified above.

With reference to FIG. 6, it is clear that a temple A, for example made of cellulose acetate or other plastic material, is intended to be hinged to the frame F of a pair of spectacles, by interposing the hinge D as described heretofore, which is already assembled.

In a first step, we proceed to introduce the male hinging element 100 inside the hole 71 of the end 7 of the temple A, exerting an adequate pressure, in cold conditions, on the bushing 2, also due to the effect of the lead-in 21, until the undulating surface 20 clamps the bushing 2 through interference inside the hole 71 of the temple A.

Without exerting any thrust, we then proceed to bring close the end 7 of the temple A and the aligned bushing 2, for example, with the front edge of the endpiece 3, so as to house the hook element 1 in the seating 30 of the endpiece 3, and to align the hole 11 of the latter to the holes 32 of the two fins 31.

Then we proceed to insert the pin 4 through the holes 32 of the fins 31 and the hole 11 of the intermediate hook element 1. The pin 4 is then screwed into the threaded hole 32 of the endpiece 3, in order to ensure a perfect, secure and easy elastic hinging of the temple A to the frame F.

Since it is not necessary to exert any pressure to couple the hook element 1 to the seating 30 and insert the pin 4 therein, it is clear that no alteration is made to the already established load of the elastic means 5 during the step of housing the male hinging element 100 in the hole 71 of the temple A and, consequently, this load remains the established one, in conformity with one of the purposes specified above.

The introduction of the bushing 2 under cold conditions inside the hole 71 of the temple A makes the position of the bushing 2 stable on the end 7 of the temple A, and achieves a solid and long-lasting coupling, and also resistant to the opening forces, without needing screws, clamping pins, bosses or otherwise, in conformity with another of the purposes specified above.

By providing an adequate play between the fins 31 and the intermediate hook element 1, it is possible to provide a suitable oscillation or orthogonal opening, and also, with a suitable inclination of the leading face of the endpiece 3, we allow a desired pantoscopic inclination of the frame F on the temples A, in conformity with other purposes specified above.

In the embodiment given as an example and shown heretofore, we have provided to use a bushing 2 having an undulating outer surface 20, so that it can be inserted under cold conditions into a hole 71 made on the end 7 of the temple A made of plastic or in any case sufficiently soft material.

Naturally, an analogous hinge D is applicable also in the case of temples A made of other material, for example of aluminum or its alloys and other titanium alloys; it is sufficient to shape the outer surface 20 of the bushing 2, with suitable shapes and adequate tolerances, correlated to the hole 71 in the respective ends 7 of the temple A, in which hole 71 the bushing 2 is housed in a forced manner, so that in any case a cold application of the male hinging element 100 is possible in every type of temple A.

Figure 9:
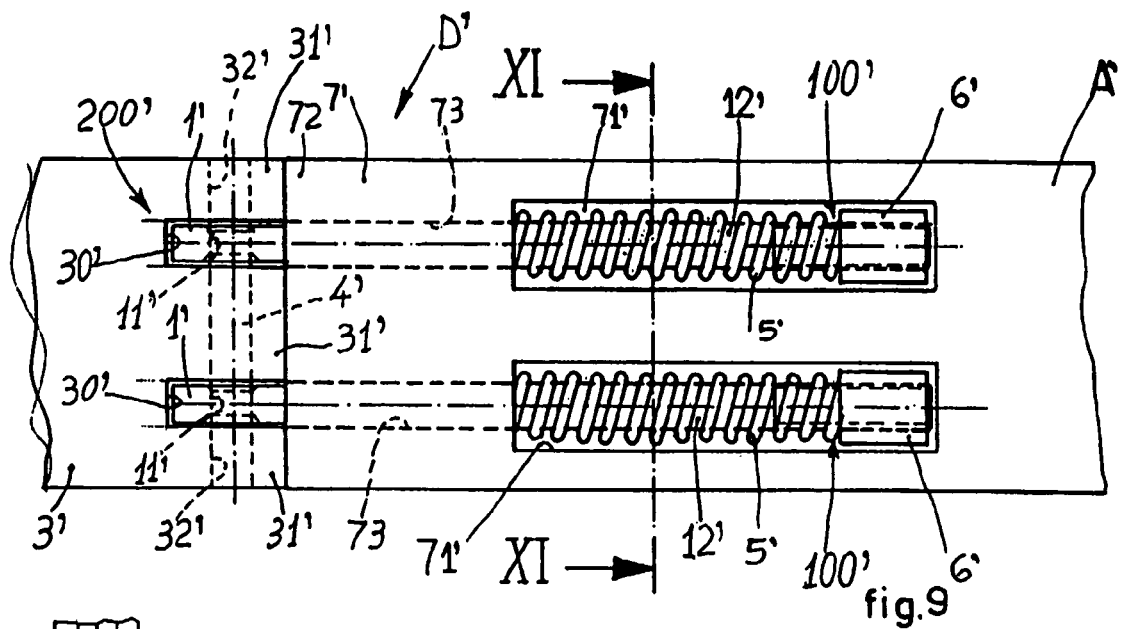
FIG. 9 is a vertical and partly sectioned view of a second form of embodiment of the hinge according to the present invention.
Figure 11:
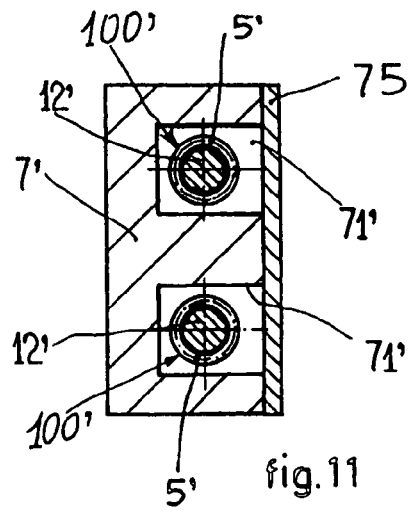
FIG. 11 is a section along the plane XI—XI of FIG. 9.

With reference to FIGS. 9 and 11, as already specified, a first variant of the hinge $D^1$ according to the invention is schematically reproduced. This provides two innovative features, although these respect the technique as described and illustrated heretofore.

A first evident variation is that in one end $7^1$ of a temple $A^1$, having a sufficiently ample front surface, two parallel and co-planar male hinging elements $100^1$ are arranged, vertically adjacent to each other and able to couple with two female elements $200^1$, the latter made according to the invention by milling directly on the endpiece $3^1$, and comprising corresponding seatings $30^1$.

Moreover, in this case, the bushing 2 is replaced by a final segment 72 of the end $7^1$ of the temple $A^1$, which comprises two cylindrical holes 73, each one able to house in, sliding and in through manner, a corresponding tie-rod $12^1$ of the male hinging element $100^1$. To be more exact, each tie-rod $12^1$ can be translated axially into the corresponding hole 73 and protrudes at the front from the latter with the hook element $1^1$ so that it is able to be associated with a single pin $4^1$ which passes through the two seatings $30^1$ made by milling in the endpiece $3^1$, according to the joining methods already described above.

As for the previously described embodiment, in this constructional variant too the ends of the tie-rods $12^1$ have a threading $13^1$ so that a nut $6^1$ can be screwed in, able to compress the elastic means $5^1$, which, during the assembly step, is arranged inside the respective hole $71^1$ before the tie-rods $12^1$ of the male hinging elements $100^1$ are inserted.

Figure 10:
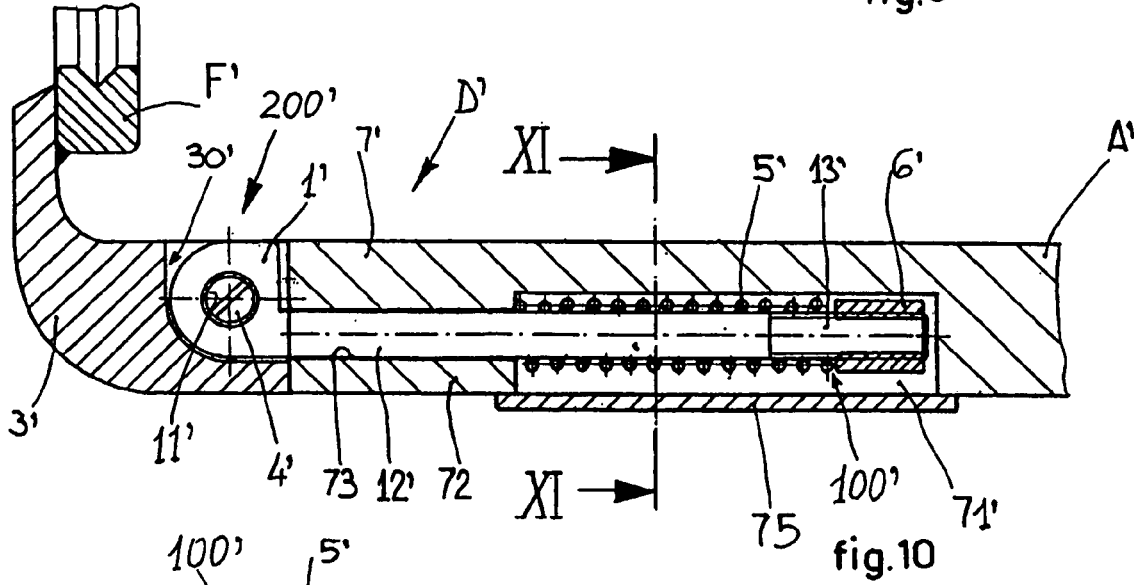
FIG. 10 is a plane view of the hinge in FIG. 9.

With particular reference to FIGS. 10 and 11, it is clear that the two holes $71^1$, housing the tie-rods $12^1$, their nuts $6^1$, and the respective elastic means $5^1$, are preferentially covered by a plate 75 which can be on the outer side of the temple $A^1$. The plate 75 can be glued or attached mechanically to the temple $A^1$ and can constitute an original solution for the application of a trademark or other decoration of the spectacles, thus achieving another advantageous use.

It is clear that, instead of the first constructional embodiment described, the elimination of the bushing 2 and the replacement thereof by a hole 73, made on the final segment 72 of the temple $A^1$, can also be achieved individually, and also a double application of hinges $D^1$, with the respective bushings 2, can be actuated on temples A sufficiently high, without precluding the extension of the innovation.

Figure 12:
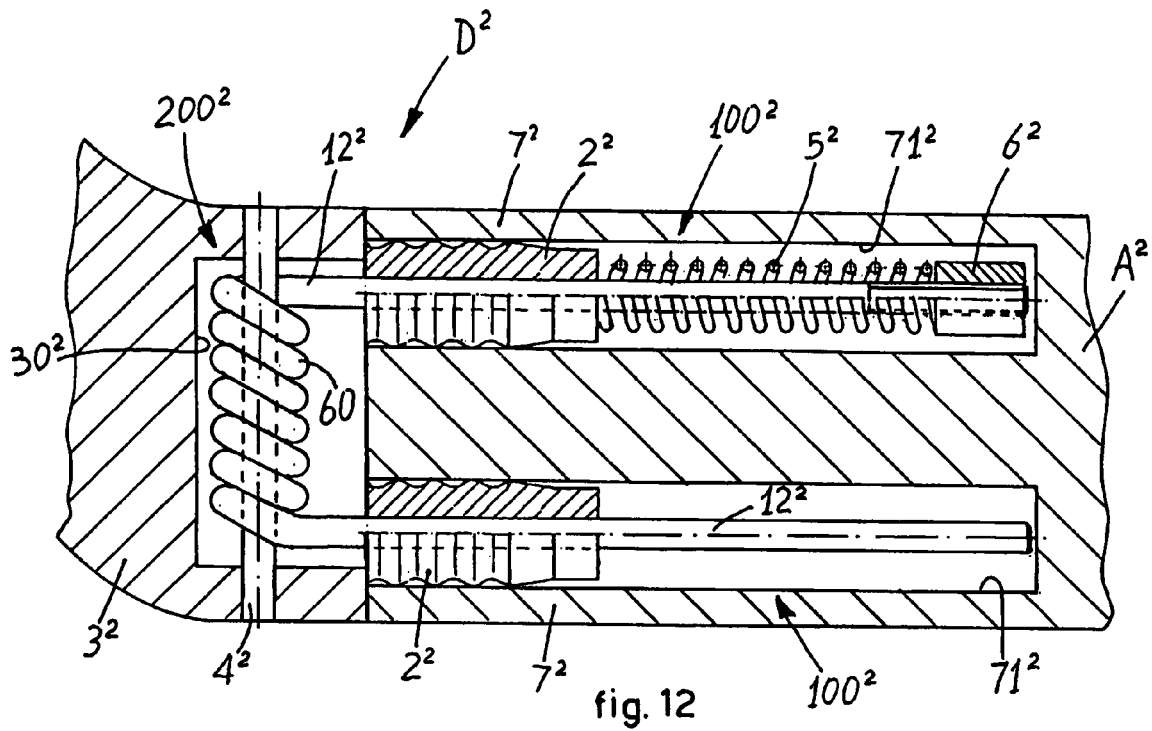
FIG. 12 is a vertical and partly sectioned view of a third form of embodiment of the hinge according to the present invention.

For example, according to the variant shown in FIG. 12, the hinge $D^2$ comprises two male hinging elements $100^2$ arranged substantially parallel and co-planar inside respective holes $71^2$ made at the end $7^2$ of the temple $A^2$. In this case, the two hook elements 1 are replaced by a joining coil 60 wound around a single pin $4^2$ and able to connect together the two ends of the tie-rods $12^2$ protruding from the holes $71^2$. The female element $200^2$ comprises, instead, a single seating $30^2$ made on the endpiece $3^2$ and is able to house inside it the joining coil 60 and both the protruding ends of the two tie-rods $12^2$.

To be more exact, in the case shown in FIG. 12, the male hinging element $100^2$ shown above comprises an elastic means $5^2$ compressed in a desired manner between the bushing $2^2$ and the nut $6^2$ in order to confer elasticity on the hinge $D^2$ formed, while the male hinging element $100^2$ shown below is without the elastic means $5^2$ and comprises only the bushing $2^2$ which functions as a guide element for the respective tie-rod $12^2$. In this way, the two male hinging elements $100^2$ respectively function as elastic actuator and guide.

Figure 13:
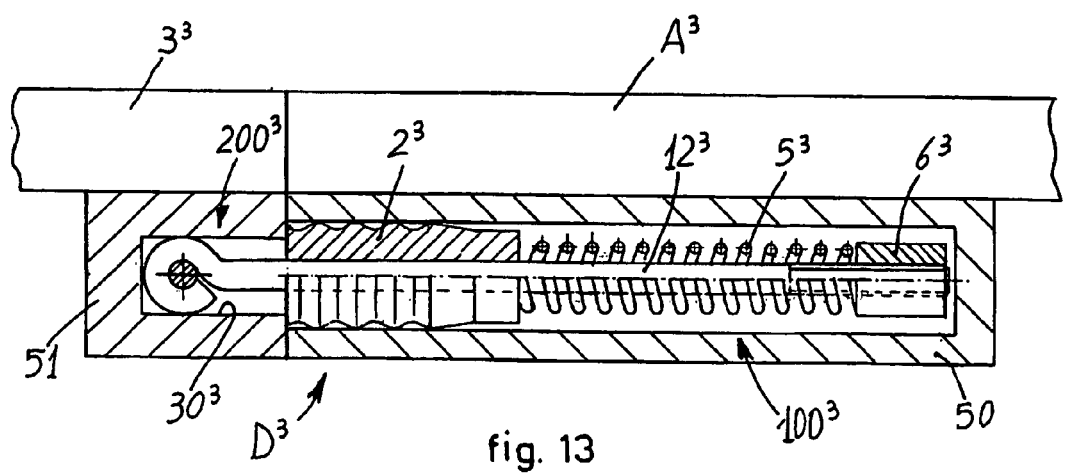
FIG. 13 is a transverse section of FIG. 12.

FIG. 13, on the contrary, shows another variant of the elasticized hinge according to the present invention, in this case indicated in its entirety by the letter $D^3$. In this case, the male hinging element $100^3$, provided as in the previous cases with a tie-rod $12^3$, a bushing $2^3$, an elastic means $5^3$ and a nut $6^3$, and the female element $200^3$, provided with a seating $30^3$, are arranged and made inside corresponding containing boxes 50 and 51, associated respectively with the temple $A^3$ and the endpiece $3^3$.

Figure 14:
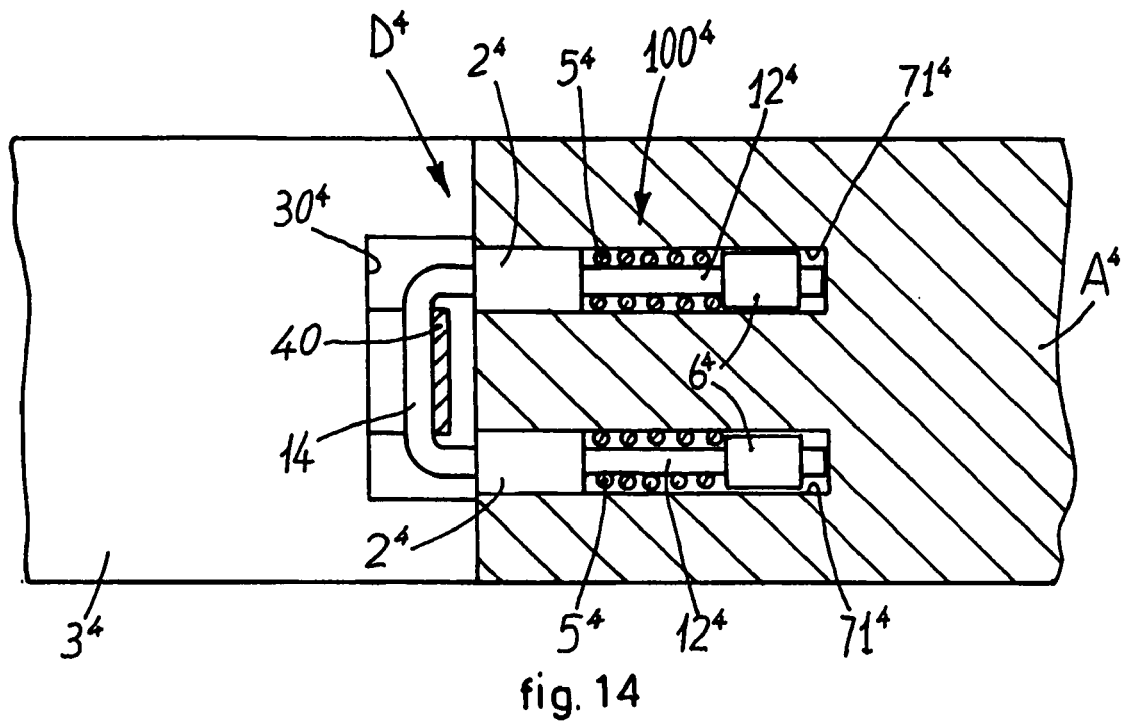
FIG. 14 is a longitudinal section of a fourth form of preferential embodiment of the hinge according to the present invention.
Figure 15:
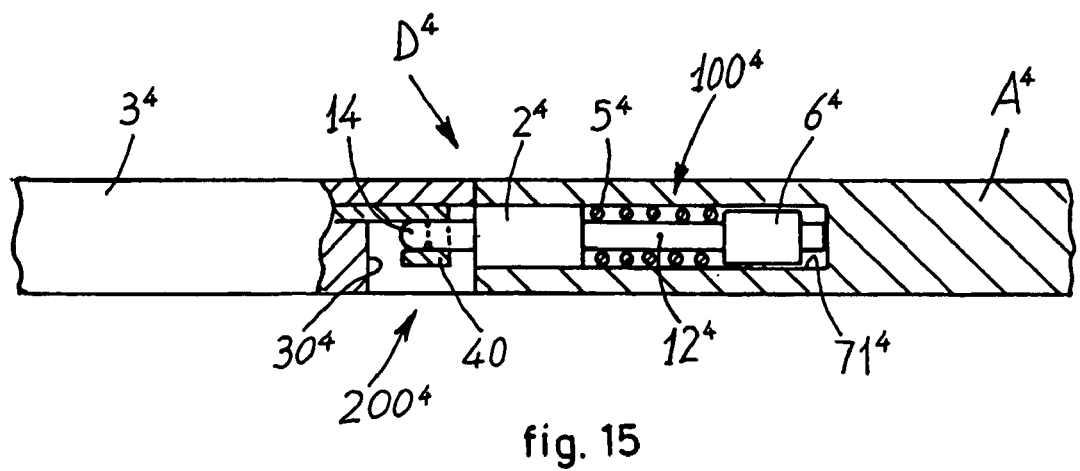
FIG. 15 is a vertical and partly sectioned view of a fifth form of preferential embodiment of the hinge according to the present invention.

In another variant, shown in FIGS. 14 and 15, the male hinging element $100^4$ of the hinge $D^4$ is substantially U-shaped, and comprises two tie-rods $12^4$ connected to each other by a segment 14 orthogonal thereto. Each tie-rod $12^4$ is inserted in a respective hole $71^4$ made on the temple $A^4$. In this case, both the tie-rods $12^4$ are associated with a respective elastic means $5^4$ compressed in a desired manner between a bushing $2^4$ and a nut $6^4$. The female element $200^4$ comprises, in this case, a hook element 40, open on one side and partly drowned inside the seating $30^4$ made on the endpiece $3^4$. In this embodiment, the hinging is achieved by associating the segment 14, which functions as a pin, with the hook element 40.

It is clear, however, that modifications and/or additions of parts may be made to the hinge D, $D^1$, $D^2$, $D^3$, $D^4$, as described heretofore, without departing from the field and scope of the present invention.

For example, it comes within the field of the present invention to provide that the hook element 1, $1^1$ can consist of a bent metal wire, connected to, or made in a piece with, the end of the respective tie-rod 12, $12^1$.

It is also clear that, although the present invention has been described with reference to specific examples, a person of skill in the art shall certainly be able to achieve many other equivalent forms of recessed hinge to make the temples of spectacles elastic, having the characteristics set forth in the claims, and therefore all coming within the field of protection defined by said claims.

The invention claimed is:

1. Recessed hinge to make a temple elastic with respect to a respective end piece of a frame of a pair of spectacles, said hinge comprising:
    at least a male hinging element pivoted to at least a corresponding female element by means of a pin inserted into the end piece through at least a through hole made in said end piece,
    said male hinging element comprising at least a tie-rod able to slide with respect to said temple,
    a bushing arranged inside said temple and axially associated with said tie-rod, and
    an elastic means loaded between said bushing and an abutment element attached to said tie-rod,
    wherein said female element comprises a seating made in said end piece by removing material, and
    said male hinging element comprises a hook element, solid with said tie-rod, housed in said seating and able to articulate on said pin
    wherein said seating is defined, in the end piece, by a lower edge defining an abutment plane for said temple in the closed condition and by a leading edge defining an abutment plane for said temple in the open condition, said lower and leading edges being substantially rectilinear, substantially orthogonal to each other and defining between them a corner,
    wherein the distance between the axis of said through hole and said corner is greater than the distances between the axis of said through hole and said leading and lower edges, and
    the male hinging element is defined by two of said tie-rods disposed co-planar and substantially parallel to each other inside the relative temple and pivoted along the same pivoting axis.

2. Recessed hinge as in claim 1, wherein said two tie-rods are housed inside relative seatings distinct from each other.

3. Recessed hinge as in claim 2, comprising a single pin to pivot said tie-rods.

4. Recessed hinge as in claim 1, wherein said two tie-rods are housed inside a single common seating.

5. Recessed hinge as in claim 4, wherein said two tie-rods are connected to each other inside said seating by a coil-type connection element, arranged around a pin.

6. Recessed hinge as in claim 4, wherein only one of said tie-rods is associated with a relative elastic means.

7. Recessed hinge as in claim 4, wherein said two tie-rods are connected to each other by a transverse element orthogonal thereto, functioning as a pin, and said female element comprises a hook element open at one side and partly drowned inside said seating, and able to cooperate with said transverse element to determine the pivoting of said male hinging element and said female element.

8. Recessed hinge as in claim 1 wherein said seating comprises at least two lateral fins provided with respective through holes, with which a central hole is axially aligned, made through transverse to said hook element, said through holes being able to allow the insertion of said pin through said fins and said hook element.

9. Recessed hinge as in claim 8, wherein at least one of said through holes is threaded to allow said pin to be screwed therein.

10. Recessed hinge as in claim 8, wherein said seating comprises at least a curved segment having a radius of curvature centered in said through holes, equal to or a little more than a radius of curvature of said hook element, centered in said central hole.

11. Recessed hinge as in claim 10, wherein said seating comprises at least two sides having a depth, with respect to the axis of the through holes, which is greater than a radius of curvature of said hook element centered in said central hole.

12. Recessed hinge as in claim 1, wherein said bushing comprises a slightly undulating outer surface a lead-in shaped like a truncated cone, and a through hole, able to house said tie-rod with a slight play.

13. Recessed hinge as in claim 1, wherein said bushing is made at one end of said temple and comprises a through hole made coaxial and having a reduced diameter with respect to a hole.

14. Recessed hinge as in claim 13, wherein said hole is open on one side and is able to be selectively closed by a plate.

15. Recessed hinge as in claim 1, wherein said male hinging element and the female element are arranged and made inside corresponding containing boxes associated respectively with said temple and with the end piece.

16. Recessed hinge as in claim 1, wherein said hook element, is insertable with play into said seating to allow a pre-determined vertical movement of the temples, and also a possible pantoscopic adjustment, by means of a prior conformation of said end piece.

17. Recessed hinge as in claim 1, wherein each hook element is equipped with a through hole inside which said articulation pin is insertable.

18. Recessed hinge as in claim 1, wherein said bushing is inserted in a forced manner under cold conditions inside the mating hole made in the relative temple.

19. Recessed hinge as in claim 1, wherein the positions and elements of articulation between the end of the temple and the end of the front-piece or end piece can be inverted respectively on the end piece and on the temple.

* * * * *